United States Patent [19]

Tobe et al.

[11] Patent Number: 5,778,224

[45] Date of Patent: Jul. 7, 1998

[54] METHOD OF EXECUTING A PLURALITY OF TRANSACTIONS AND A DISTRIBUTED PROCESSING SYSTEM FOR PERFORMING SUCH A METHOD

[75] Inventors: Akihiko Tobe, Naka-machi; Hiroshi Nosaki, Houya; Manabu Shinomoto, Katsuta; Naoki Miwa, Hitachi, all of Japan

[73] Assignee: Hitachi, Ltd., Tokyo, Japan

[21] Appl. No.: 787,357

[22] Filed: Jan. 22, 1997

Related U.S. Application Data

[63] Continuation of Ser. No. 606,236, Feb. 23, 1996, abandoned, which is a continuation of Ser. No. 179,478, Jan. 10, 1994.

[30] Foreign Application Priority Data

Jan. 19, 1993 [JP] Japan ..................... 5-006430

[51] Int. Cl.$^6$ ..................................... G06F 9/00
[52] U.S. Cl. ................... 395/670; 395/672; 395/675
[58] Field of Search ........................ 395/670, 671, 395/672, 673, 674, 675

[56] References Cited

U.S. PATENT DOCUMENTS

| | | | |
|---|---|---|---|
| 4,356,546 | 10/1982 | Whiteside et al. | 364/200 |
| 4,430,699 | 2/1984 | Segarra et al. | 364/200 |
| 4,890,227 | 12/1989 | Wantanabe et al. | 364/200 |
| 5,115,505 | 5/1992 | Bishop et al. | 395/650 |
| 5,283,897 | 2/1994 | Georgiadis et al. | 395/650 |
| 5,404,515 | 4/1995 | Chasse et al. | 395/650 |
| 5,414,849 | 5/1995 | Yamamoto | 395/650 |

FOREIGN PATENT DOCUMENTS

| | | |
|---|---|---|
| 58-151666 | 9/1983 | Japan . |
| 62-245361 | 10/1987 | Japan . |
| 1-283663 | 11/1989 | Japan . |

Primary Examiner—Dennis M. Butler
Attorney, Agent, or Firm—Kenyon & Kenyon

[57] ABSTRACT

In order to execute a plurality of transactions using a plurality of computers connected in a network, a plurality of distribution arrangements are defined and stored in one of the computers, which acts as a management computer. Each distribution arrangement corresponds to a predetermined distribution of the transactions among the computers. One of the distribution arrangements is distributed to all the computers, and transactions executed on the basis of that distribution arrangement. Subsequently, a further distribution arrangement is distributed to the computers so that, when a suitable change-over conduction occurs, the transactions may be executed on the basis of the further distribution arrangement. The change-over condition may correspond to a particular time, failure of one of the computers, expansion of the network, or overload. In this way, the network may adapt to different circumstances without excessive processing being required.

21 Claims, 13 Drawing Sheets

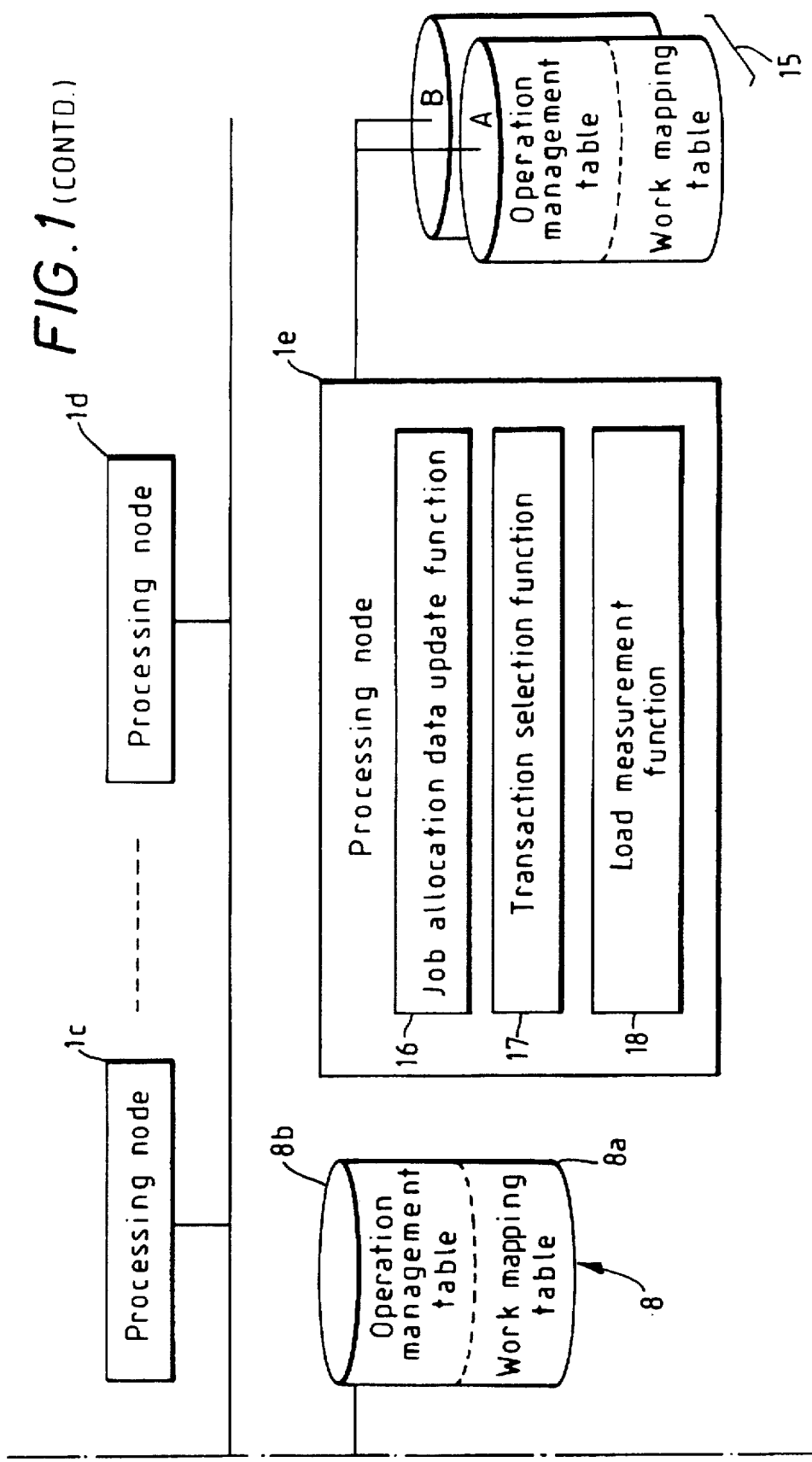

FIG.2

| Processing node<br>Job | Node 1 | Node 2 | Node 3 | ... | Node m |
|---|---|---|---|---|---|
| Job 1 | O | – | – | | – |
| Job 2 | – | O | – | | – |
| Job 3 | – | O | – | | – |
| ...... | | | | | |
| Job n | – | – | – | | O |

(Table a1)

| Processing node<br>job | Node 1 | Node 2 | Node 3 | ... | Node m |
|---|---|---|---|---|---|
| Job 1 | – | O | – | | |

(Table a2)

(Table ai)

8h

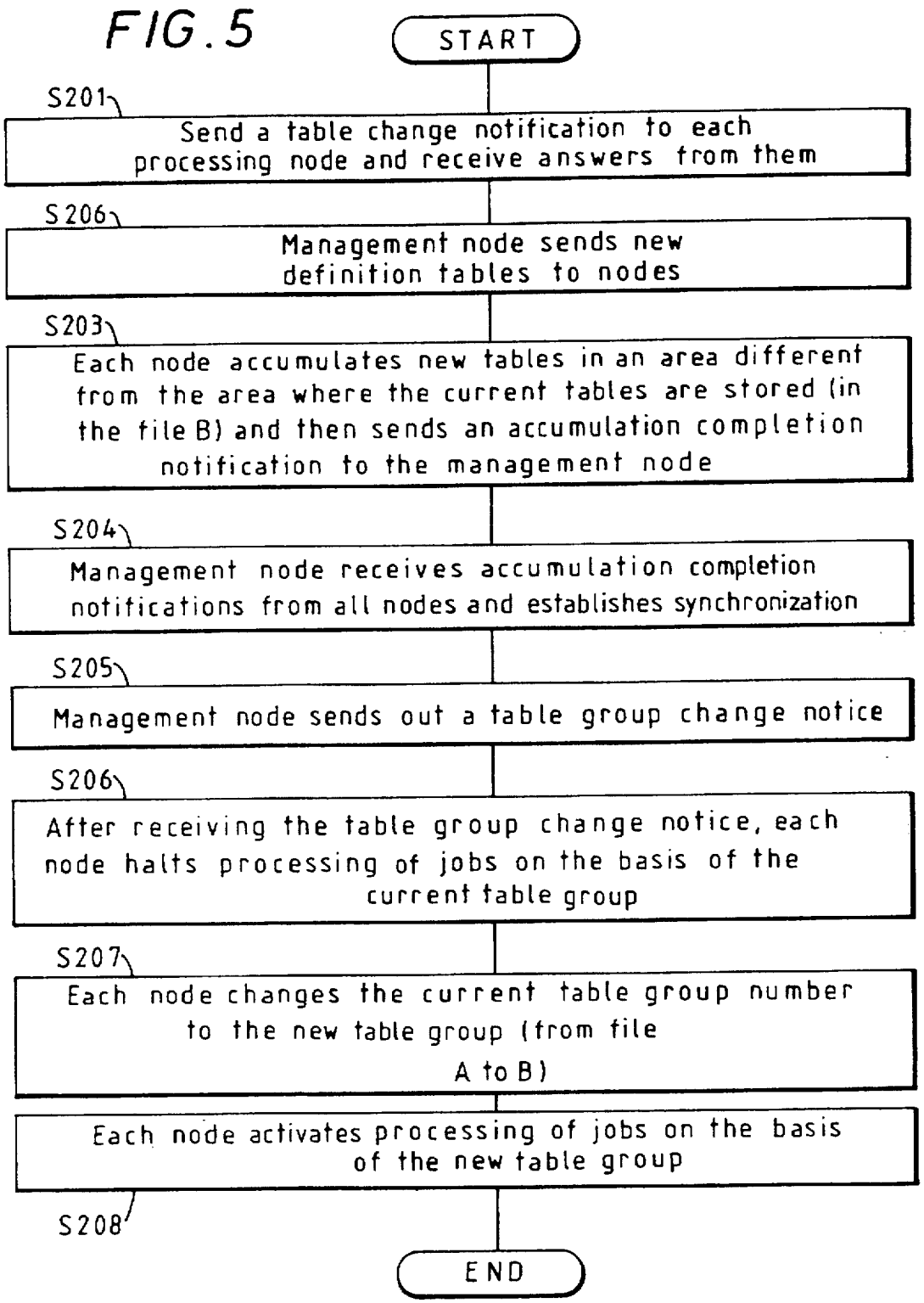

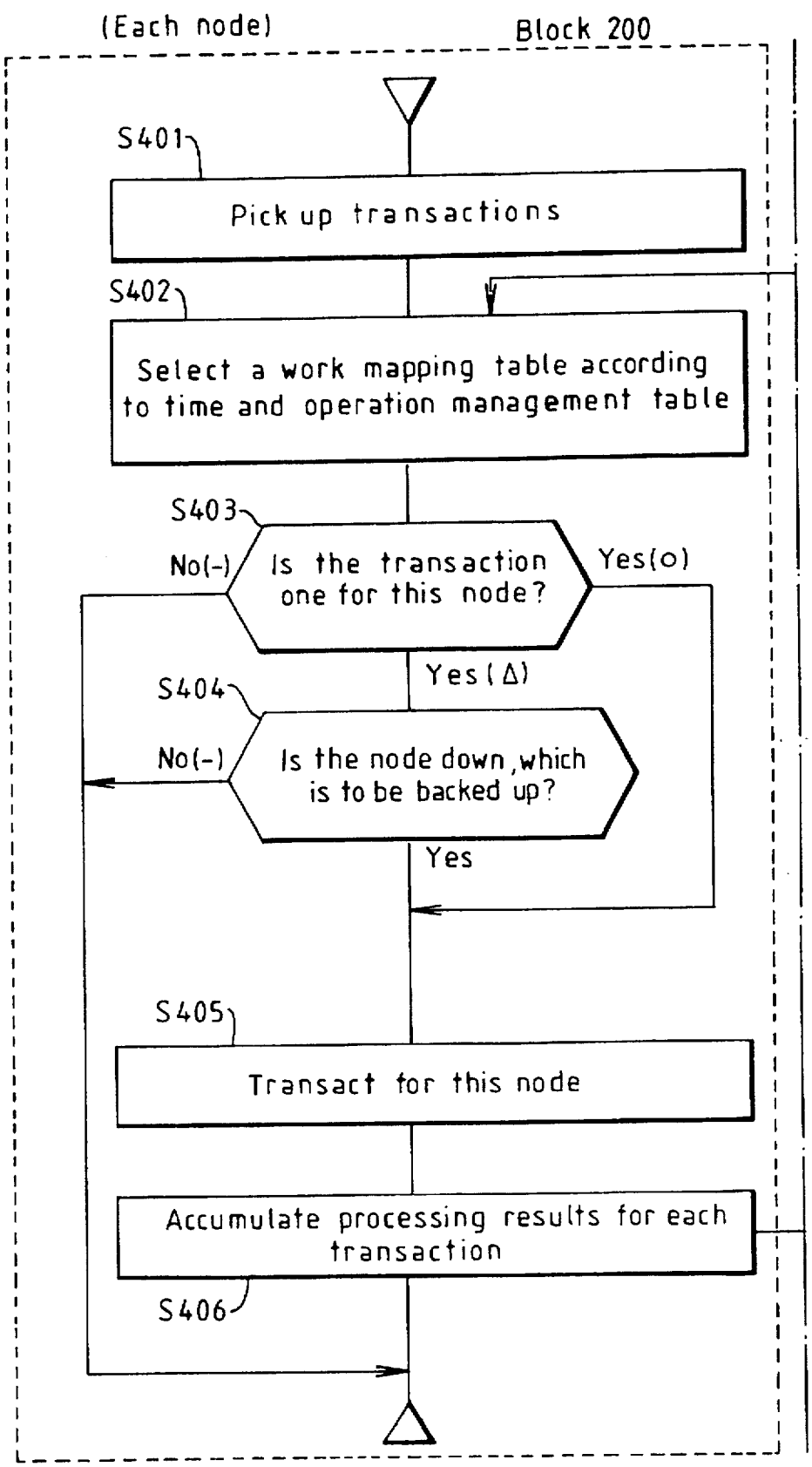

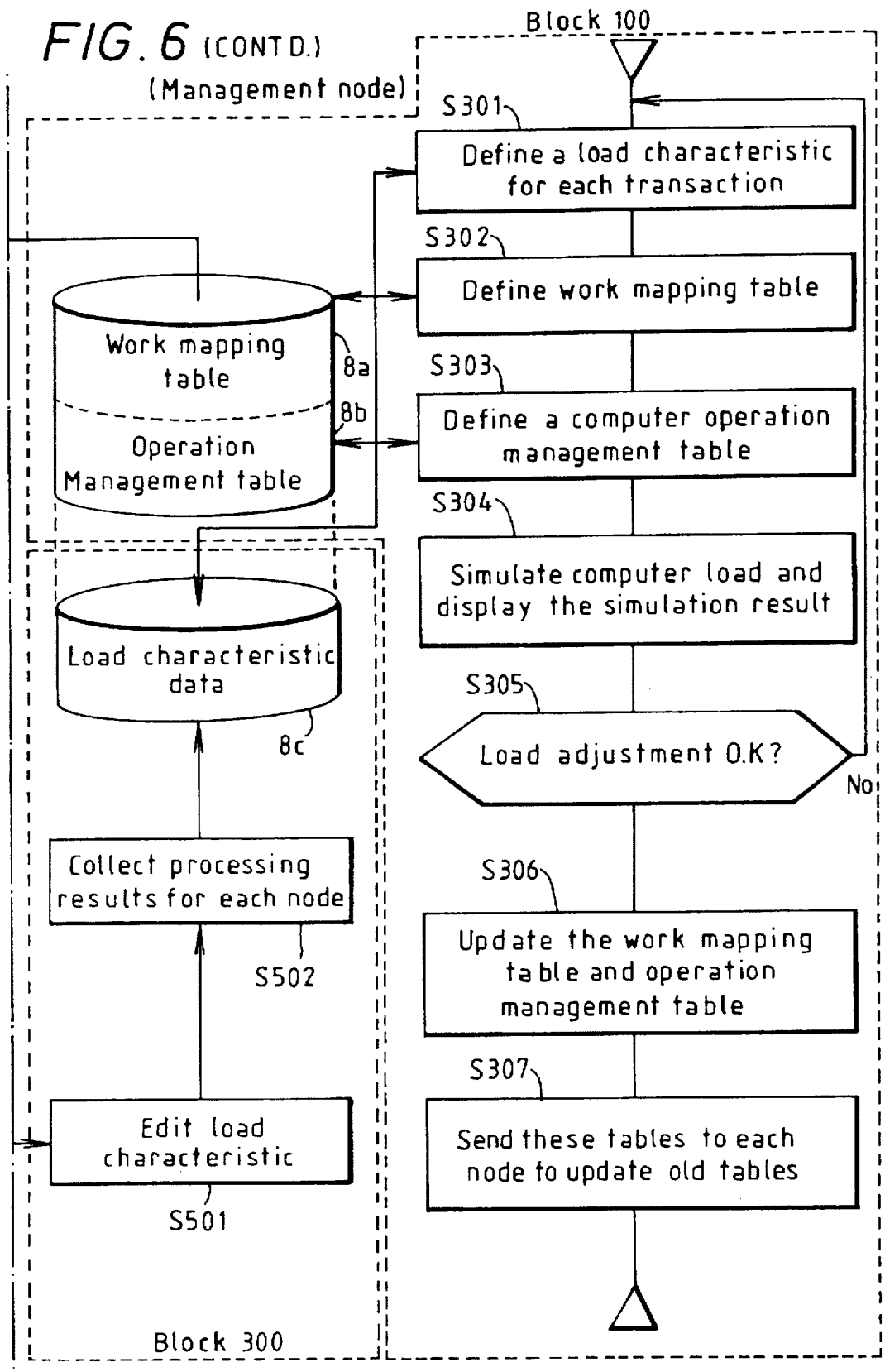

① . Load of job 1
② . Load of job 2
③ . Load of job 3

FIG. 8 (CONT'D.)

Work mapping table

Table A

| Processing node / Job | Node 1 | Node 2 |
|---|---|---|
| Job a | O | — |
| Job b | — | O |
| Job c | — | O |

Table A'

| Processing node / Job | Node 1 | Node 2 |
|---|---|---|
| Job a | O | — |
| Job b | — | O |
| Job c | O | — |

Operation management table

| Table name | Time | | | | |
|---|---|---|---|---|---|
| Table A | 6:00 | 12:00 | 18:00 | 24:00 | 6:00 |

METHOD OF EXECUTING A PLURALITY OF TRANSACTIONS AND A DISTRIBUTED PROCESSING SYSTEM FOR PERFORMING SUCH A METHOD

This application is a continuation of application Ser. No. 08/606,236 filed on Feb. 23, 1996, now abandoned, which is a continuation of application Ser. No. 08/179,478 filed on Jan. 10, 1994.

BACKGROUND OF THE INVENTION

1. Field of the Invention

The present invention relates to a method of executing a plurality of transactions in a plurality of computers. The present invention also relates to a distributed processing system for carrying out such a method.

2. Summary of the Prior Art

There have been many proposals for distributed processing arrangements, in which a plurality of transactions (also known as tasks or jobs) are distributed among a plurality of computers, for processing. The computers are interconnected in a network. In situations where there are a very large number of such transactions, such a distributed arrangement permits the processing of the transactions to be achieved more rapidly than would be possible if they were executed in a single computer. However, in such a distributed arrangement, it is necessary to allow for varying load patterns. Thus, if particular types of transactions are respectively assigned to particular ones of the plurality of computers, it is possible for one or more of the computers to become overloaded, if the number of transactions assigned thereto is high, and this could result in faulty execution of the transactions, or a slowing-down of the execution of the transactions.

For example, if the transactions relate to stock trading, the volume of transactions occurring soon after the trading starts, or immediately before the trading closes, is often more than double the number of transactions that occur at other times.

Hence, proposals have been made which seek to avoid overload of any one computer in an interconnected network. Such proposals generally fall into two types. In the first type, the maximum permitted loads of each computer were predetermined, and information relating thereto was stored in one control computer. Then, all transactions to be executed were fed to that one control computer, which distributed the transactions to the other computers, in a way that sought to ensure that none became overloaded. For example, and as proposed in JP-A-62-245361, each new transaction received by the control computer was allocated to the least-loaded of the other computers. Alternatively, as disclosed in JP-A-1-283663, a continuously-updated distribution table was defined within the control computer, which table was updated each time a transaction was received and act as a record of the load on each computer.

In the second type of proposals, there was continuous monitoring of the loading of each computer, so that any computer which became overloaded may have transactions transferred therefrom to one of the other computers. An example of this is disclosed in JP-A-58-151666.

SUMMARY OF THE PRESENT INVENTION

Both of the two types of proposals discussed above, which sought to provide an appropriate distribution of transactions among a plurality of computers, have been found to create a new problem. Where all transactions are received by a control computer, and distributed to the other computers from that control computer, the processing of the distribution by the control computer acts as a "throttle" on the system as a whole. The control computer must investigate each transaction sufficiently to determine which of the other computers is to receive the transaction, and this takes time. Where a very large number of transactions occur in a short period of time, the control computer may not be able to carry out its investigations sufficiently rapidly. On the other hand, where the loads of the computers are continuously monitored, and transactions transferred among the computers, a considerable proportion of the available processing time may be taken up in monitoring loads and transferring transactions, rather than executing the transactions.

The present invention seeks to overcome these problems, and at its most general proposes that a plurality of distribution arrangements be pre-defined, each corresponding to a predetermined distribution of transactions among the plurality of computers. Then, at any particular time, transactions are distributed on the basis of one of those distribution arrangements. However, the system can be re-organized to distribute the transactions on the basis of another of the arrangements.

Normally, the distribution arrangements will each be defined by a corresponding table stored in one of the computers. However, other ways of defining the distribution arrangements are possible, which do not need specific tables to be stored. For example, processing algorithms may be set up which provide distribution arrangement equivalent to processing by tables.

The present invention can be considered from two viewpoints. From the first viewpoint, one of the distribution arrangements is distributed to the computers, and the plurality of transactions executed by the computers on the basis of the distribution correspond to that distribution arrangement. Then, subsequently, another of the pre-determined distribution arrangements (a 'new' distribution arrangement) is distributed to the computers, and the computers subsequently execute the transactions on the basis of a new distribution corresponding to that new distribution arrangement. This viewpoint therefore considers the behavior of the computers over the relatively long time period. From the second viewpoint, however, the storing of the predetermined distribution arrangements computer may be considered, at any time, to select one of the predetermined distribution arrangements on the basis of a characteristic of the computers and the transactions, so that the transactions are distributed on the basis of that distribution arrangement. This viewpoint considers the invention on an instantaneous basis.

Since, in according with the present invention, all the computers act on the basis of one distribution arrangement at any one time, each computer may determine for itself whether it is to process a given transaction. Hence, it is not necessary for all the transactions to be investigated by a central control computer, to determine which of the computers is to execute the transaction. On the other hand, since the plurality of transaction arrangements may be stored in a single computer (a 'management' computer), which detects the occurrence of a particular characteristic of the system to change the operation of the system from one distribution arrangement to another, the amount of monitoring of the system may be significantly reduced, as compared with those systems which continuously check for overload in each of the computers.

Thus, for example, in a stock trading arrangement, the volume of the transactions varies greatly, but in a relatively predictable way based on the time of day, or time of week. Therefore, different distribution arrangements may be generated, corresponding to the expected distribution at particular times of the day or week, and then those distribution arrangements are distributed to the plurality of computers on a time-basis, so that the computers have an appropriate distribution arrangement for each of a series of successive time periods during the day and/or week. By appropriate definition of the distribution arrangements, predicted normal load changes can be allowed for, as can special load changes, e.g. those for time periods in which the pattern of transaction generation is unusual.

The present invention also permits the arrangement readily to allow for expansion of the system, for example an increase in the number of computers. All that is needed is for one or more new distribution arrangements to be created, which distribute transactions to the increased number of computers, and then the or each new distribution arrangement can be distributed to all the computers of the system, without any significant re-programming of the computers already operating. Therefore, such expansion can occur on a on-line basis which is particularly useful where it is undesirable for there to be a break in transaction processing. Thus, in a similar way, the present invention permits the arrangement readily to cope with failure or defects in one or more of the computers. For example, if one of the computers fails completely (e.g. due to a hardware failure), that failure can be detected and a new distribution arrangement distributed to the other computers, so that all transactions are still executed, with none of the transactions being assigned to the computer which has failed. In a more complex situation, a particular function may be considered to have failed within one or more of the computers, in which case a new distribution arrangement is used in which transactions needing that function are not distributed, or not distributing to the computer providing that function.

In certain arrangements within the present invention, it is possible for a new distribution arrangement to be distributed to the computers only at the time when it is needed. However, particularly when the change from one distribution arrangement to another is predictable, it is better to distribute the new distribution arrangement in advance of the time at which it is going to be needed. Then, each computer may carry out in advance the processing needed to store the new distribution arrangement, so that the new distribution arrangement is stored appropriately by the time it is needed. Then, all the computers may change over to the new distribution arrangement instantaneously on the distribution of a change-over signal. If the distribution arrangements are only distributed at the instant they are needed, there is the possibility that one or more of the computers may be slower than others in processing the distribution arrangement for storage, so that the system would not be fully synchronized at the time of change-over.

The present invention permits two further developments. It is possible for the system to monitor the workload of each computer within the network, and for a new distributed arrangement to be distributed if any one of the computers reaches, or approaches, overload. The system can then accommodate unpredictable changes in the volume of the transactions to be executed. However, this then requires the number of transactions to be processed by each of the computers to be monitored, which introduces a further processing operation.

In addition, the system may be arranged to "learn" either by input of further data from a user or automatically. Thus, for example, if overload regularly occurs under specific conditions, which had not been predicted in advance, such overload may be detected by the system and new distribution arrangements be defined to re-distribute the transactions at such times.

It should be noted that although the above discussion refers to a processing arrangement or system, the present invention is applicable to a method of executing a plurality of transactions and to a distributed processing system for carrying out such a method.

BRIEF DESCRIPTION OF THE DRAWINGS

Embodiments of the present invention will now be described in detail, by way of example, with reference to the accompanying drawings, in which:

FIG. 2 illustrates two distribution arrangements (tables) which may be used in the embodiment of FIG. 1;

FIG. 5 is a flowchart showing in detail the processing steps needed to change from one distribution arrangement (table) to another;

FIG. 6 is a flowchart showing an operating scheduling support function, a load characteristic editing function, and a transaction selection function in the embodiment of FIG. 1;

DETAILED DESCRIPTION

A first embodiment of this invention will now be described with reference to FIGS. 1 to 6.

Figure 1:
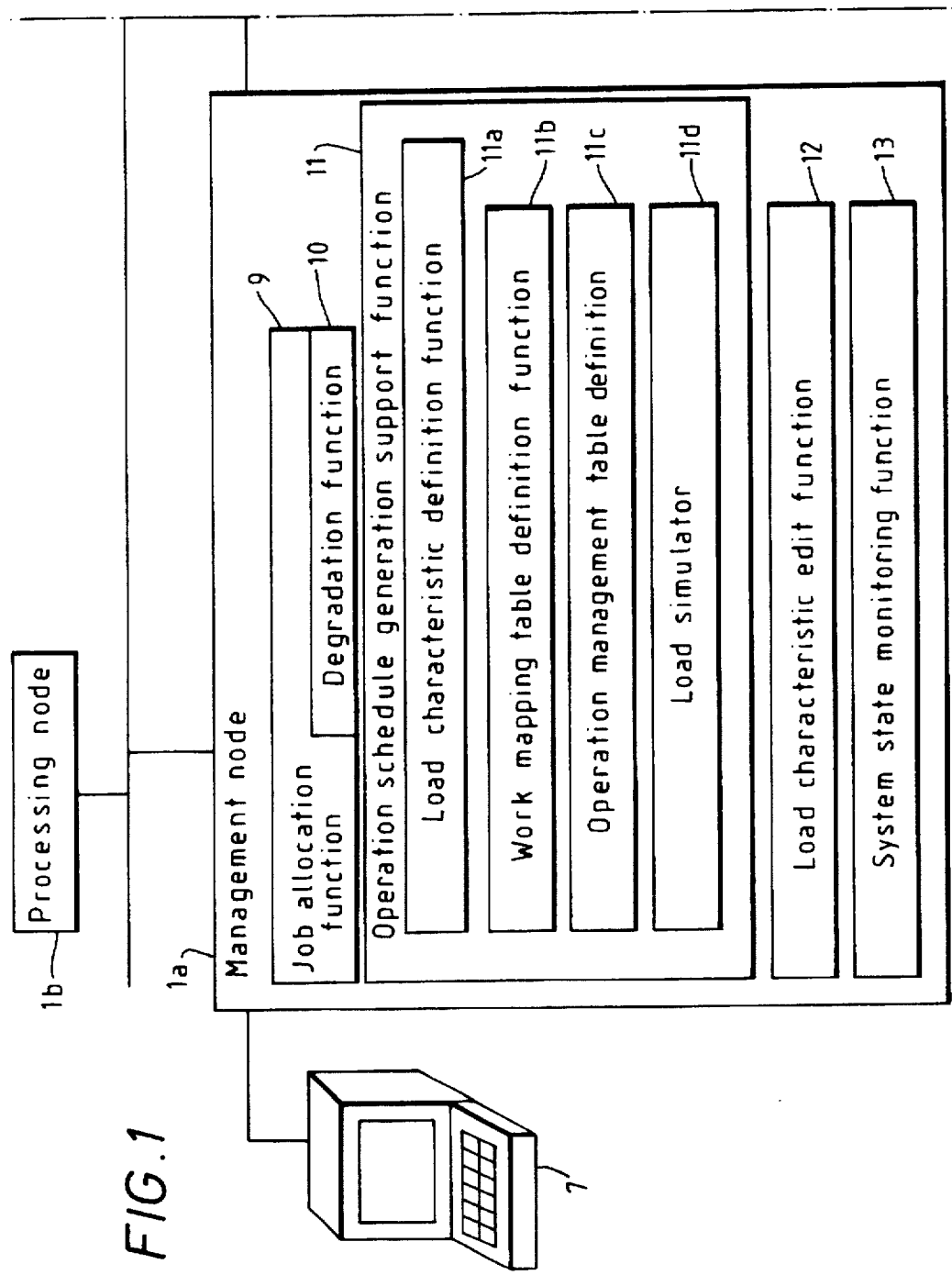
FIG. 1 is a schematic block diagram showing the overall configuration of a first embodiment of the present invention.

FIG. 1 shows the overall configuration of the first embodiment. Computers 1a to 1e are interconnected by a communications line 6 to form a distributed processing system. The computer 1a acts as a management node to control the distribution of load in the entire system. The computer 1 has a console 7 as an input/output interface, and a storage device 8. The computers 1b to 1e are processing nodes that execute transactions. It may be noted that load distribution management may be considered to be equivalent to a transaction, the management node may be changed to another one of the computers 1a to 1e or the load distribution management and other transactions may be carried out in one node (computer).

The management node 1a has the following functions: a job allocation function 9 to select job allocation data stored in the storage device 8 and send it to the processing nodes; an operation schedule generation support function 11 for defining a plurality of job allocation data, which consists of a load characteristic definition function 11a, a work mapping definition function 11b, an operation management table definition function 11c, and a load simulation function 11d;

a load characteristic edit function 12 that gathers processing records of each processing node to calculate and edit the load characteristics; and a system running state monitoring function 13 which detects transaction anomalies, processing node anomalies and overloads. The job allocation function 9 has a degradation function 10 which degrades the transaction according to the transaction anomaly. The job allocation data in this embodiment comprises data defined in work mapping tables and operation management tables.

The processing nodes 1b to 1e each have a job allocation data storage device 15. The storage device 15 has a file A and a file B, and the job allocation data received from the management node 1a is stored in the storage device 15 on the basis of the job allocation data update function 16 (in a way that will be described later) so that the data is alternately stored as a current data and updated data.

The processing nodes 1a to 1e also each have a transaction selection function 17 which selects, on the basis of the job allocation data, transactions to be processed by the corresponding node in specified time bands and decides whether or not the received transactions require processing, and a load measurement function 18 which obtains basic data to define a load characteristic (to be described in more detail later).

FIG. 2 shows the concept of the work mapping table 8a, with transaction names shown along a vertical axis, processing nodes along a horizontal axis and flags (marked ○) at nodes that process the corresponding transactions to define an arrangement (pattern) of combinations between the transactions and the nodes in the system. Any number of arrangements can be defined and tables $a_1$ to $a_i$ of these arrangements are stored.

Figure 3:
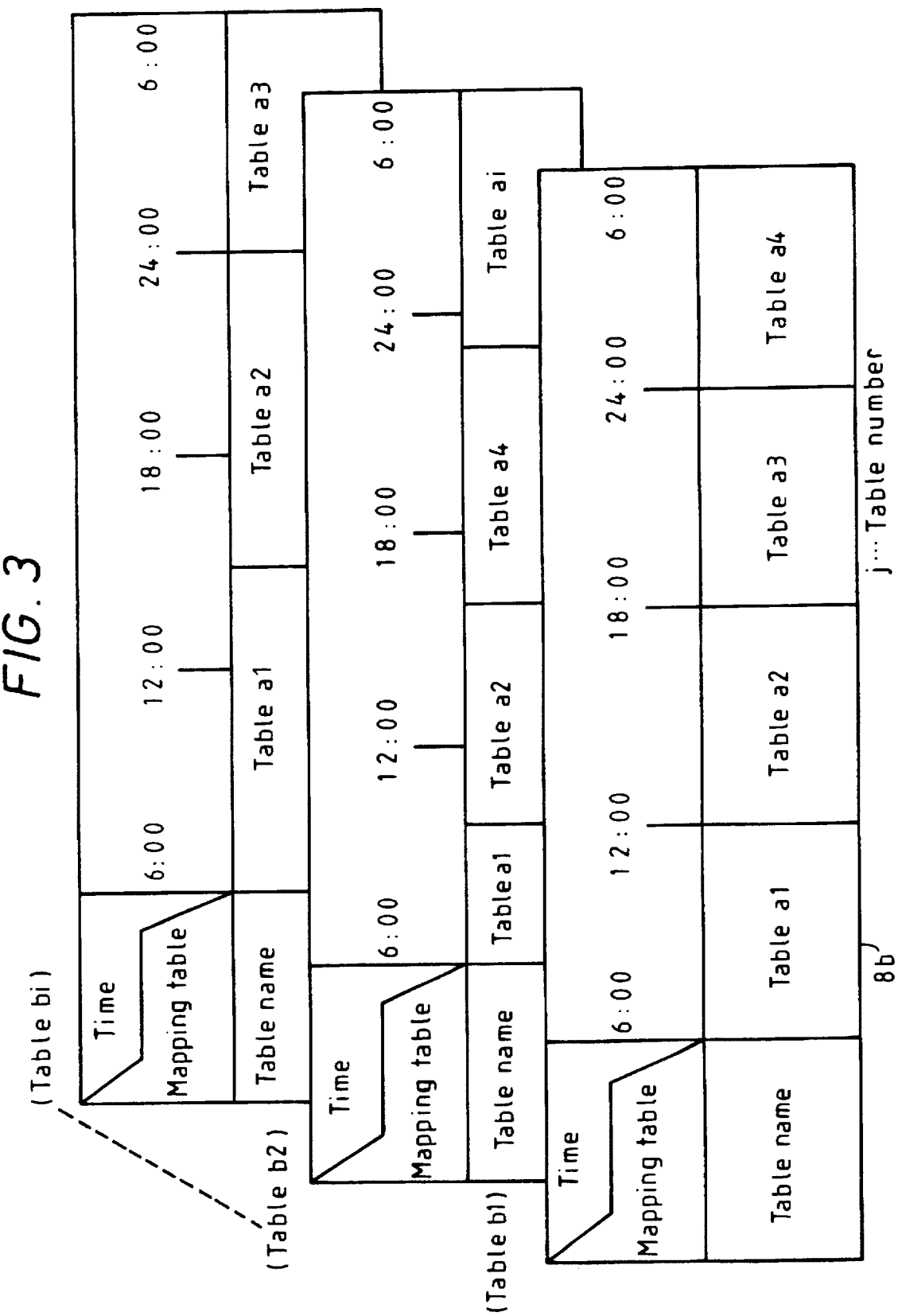
FIG. 3 illustrates an operation management table which defines relationships among the distribution arrangements in the embodiment of FIG. 1.

FIG. 3 shows the operation management tables 8b which define the names of the work mapping tables ($a_1$ to $a_i$) that the system uses in each time band. Several operation management tables $b_1$ to $b_j$ are prepared, which are defined according to the load characteristics on particular days. The time scale may be determined arbitrarily but normally each table covers one day or 24 hours of activity.

Figure 4:
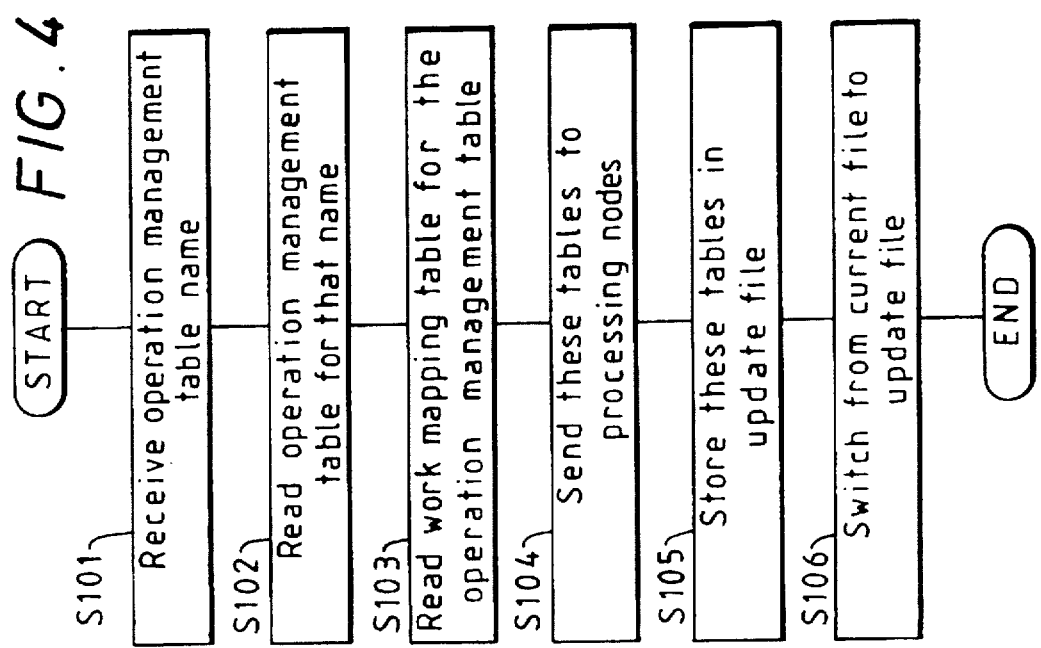
FIG. 4 is a flowchart showing basic processing steps carried out by the embodiment of FIG. 1.

Next, the operation of this system will be discussed. FIG. 4 shows the basic steps for processing the job allocation function 9 of the management node 1a and the job allocation data update function 16 of the processing nodes 1b and 1e.

In the first step (step s101), the job allocation function 9 receives an operation management table, (e.g. $b_1$ to $b_j$) and retrieves the corresponding operation management table from the storage device 8 (step s102). The name of the operation management table may be automatically specified from a correspondence table between the table name and the day of the week, or may be specified by the user using console 7. From the plurality of work mapping table names recorded in each operation management table b thus retrieved, the corresponding work mapping tables $a_1$ to $a_i$ are read (step s103) and these tables $b_j$, $a_1$ to $a_i$ are sent to the processing nodes 1a to 1e (step s104).

The job allocation data update function 16 stores the operation management table $b_j$ and the work mapping tables $a_1$ to $a_i$ received from the management node 1a, first in the file A and then in the update file B (step s105). Then upon reception of a change notification (from A to B) from the management node 1a, the function 16 switches the file to be accessed from the current file to the update file (step s106). After file switching, the allocation data in the file B becomes the current data. The file A is now used as an update file and may be updated, as necessary, by the procedure of steps s101 to s105.

In this way, a change in the job allocation data can be carried out instantaneously by switching between the files A and B while the system remains on-line. Thus, the processing nodes 2 to 5 in this system need not have all the tables pre-stored therein. Instead, the tables for the current day may be stored in the file A and the tables for the next day may be sent to the file B at an appropriate time before file switching (for example, when the workload is light). It is also possible to prepare a large number of files to subdivide the classifications in terms of switching timings and objects to switch between.

FIG. 5 shows the steps for transferring newly defined tables prepared as a result of system extension. Thus, FIG. 5 can be considered as showing in more detail the steps s104 to s106 in FIG. 4. The management node 1a notifies the processing nodes of a table group change and receives answers from the processing nodes 1a to 1e (steps s201). The management node 1a distributes a different operation management table and corresponding work mapping tables to each node 1b to 1e (step s202). Each processing node 1b to 1e stores the new tables in an area different from the area where the current tables are stored (i.e. in file B if the current tables are in file A) and then sends a storage completion signal to the management node 1a (step s203). The management node 1a, after having received storage completion signals from all the processing nodes 1b to 1e, establishes that the processing nodes 1b to 1e are synchronized (step s204). Then the management node 1a sends out a table group change signal (step s205). After receiving the table group change signal, each processing node 1b to 1e halts processing of jobs on the basis of access the current table group (step s206), changes the current table group to the new table group (i.e. changes from file A to file B) (step s207) and activates processing of jobs on the basis of the new table area (step s208). The new table then becomes the current table, and the updating effect can occur again later.

In this example, the file B is updated for all tables. It is also possible to send the name of only one new table from the management node 1a to update only that table, with the remaining tables being transferred from the current file A within each processing node 1b to 1e.

In this embodiment, the interruption of the transaction processing due to the change from one table group to another lasts only a very short time, during which time the access destination is switched by the procedure of steps s206–s208. The switching allowing the processing nodes 1b to 1e to process transactions using the new tables while remaining on-line. This improves the utilization factor of the system, even if its traffic specification is changed frequently.

The processing steps shown in FIG. 6 illustrate the relationship between the operation schedule generation support function 11 (block 100 of the management node) and the load characteristic edit function 12 (block 300), and the transaction selection function 17 of the processing nodes 1b to 1e (block 200).

The operation schedule generation support function 11 assists the user of the system to prepare the work mapping tables 8a and operation management table 8b. First, this function 11 reads the load characteristic data from the load characteristic data file 8c, making necessary changes to the data or permitting the user to change the data. This has the effect of defining the load characteristic for each transaction (step s301). Next, on the basis of information input by the user, the function 11 defines a plurality of work mapping tables (step s302) and a specified operation management table (step s303). By using the defined tables, the load condition of each node (step s304) is simulated. If distribution of the load among the processing nodes 2 to 5 is satisfactory (step s305), the work mapping table files 8a and the operation management table file 8b are updated (step s306). Subsequently, at step s307, the tables may be sent to the processing nodes 2 to 5 in the way described with reference to FIG. 5. The step s307 is performed by the job allocation function 9.

The transaction selection function 17 in block 200 selects transactions to be processed, on the basis of the work mapping tables 8a and the operation management table 8b supplied from the management node 1a and stored in the job allocation data storage device 15 in the corresponding processing node 1b to 1e. First, the function 17 detects the transactions received by the node (step s401). Next, the processing node 1b to 1e refers to an operation management table, depending on the current time and selects the appropriate work mapping table corresponding to the current time (step s402). The processing node 1b to 1e then checks whether the received transaction is a transaction which is to be executed by that node, on the basis of the mapping table (step s403). If the transaction is to be executed, the processing node 1b to 1e processes the transaction (step s405). If the transaction is not one to be processed by the processing node 1b to 1e, the normal situation is that the transaction is not processed.

In the above example, the job allocation data in each processing node 1b to 1e consists of data from two tables, namely an operation management table and work mapping tables. It is also possible, however, for the management node 1a to pre-select the necessary work mapping table, based on an operation management table of the management node 1d, and to distribute the selected work mapping table to the processing nodes 1b to 1e. In this case, the change from one work mapping table to another occurs by sending, at a time when the change is to be made, the selection data (name of the modified table) from the management node 1a to each processing node 1b to 1e in dependence on the operation management table.

Figure 7:
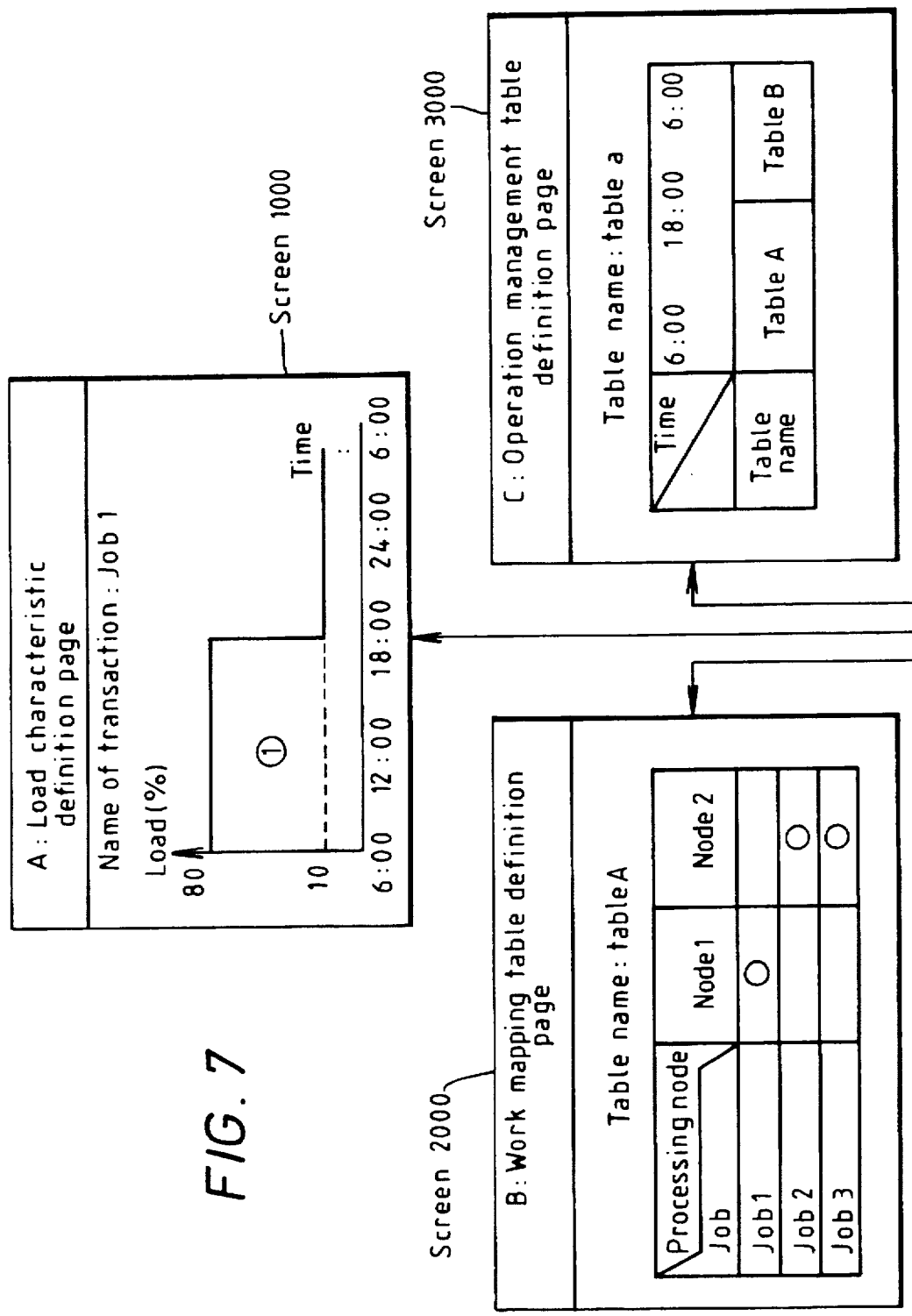
FIG. 7 shows a plurality of screens displaying information relating to the operation of the embodiment of FIG. 1.
Figure 7:
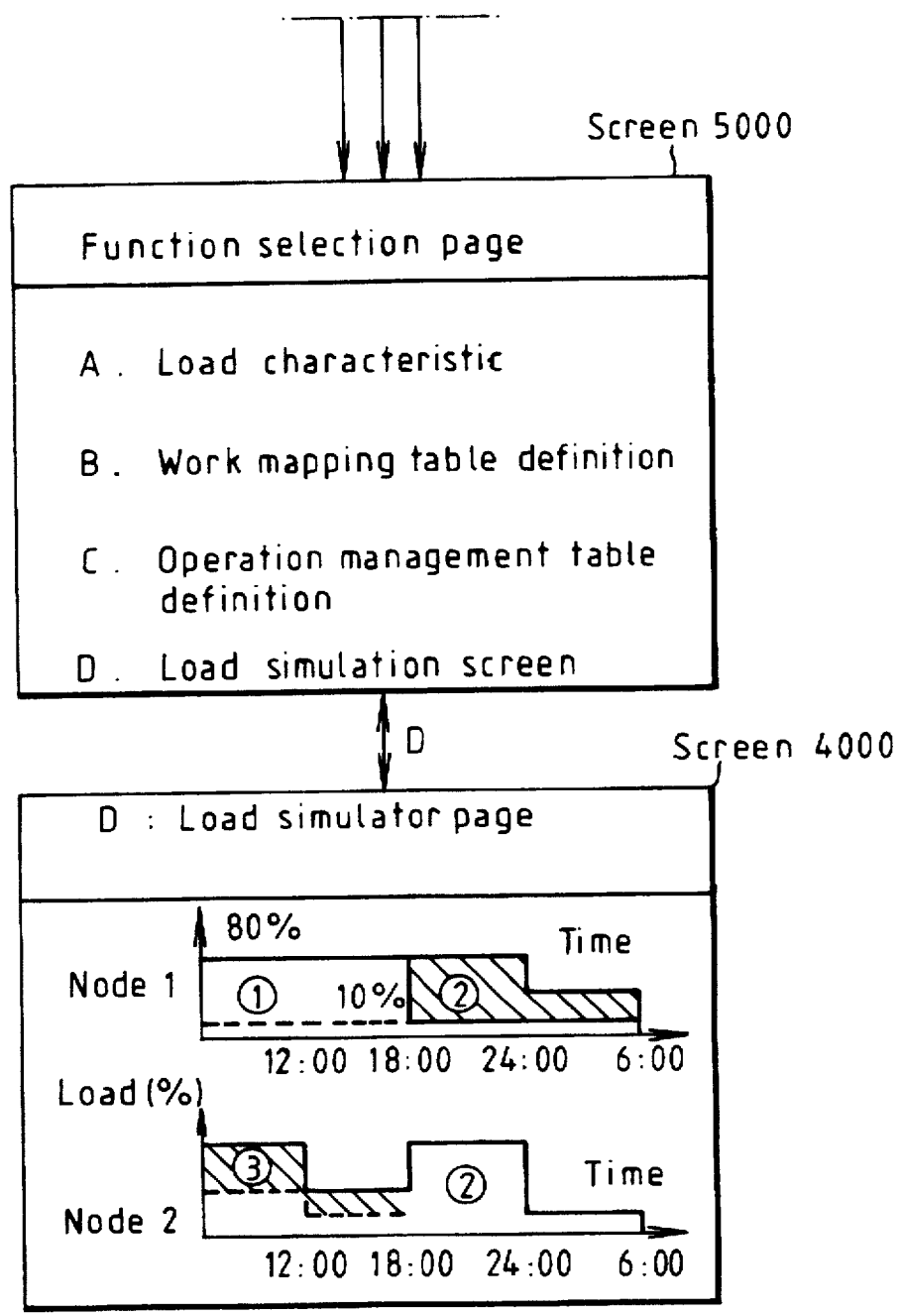

Next, the procedure for defining the operation schedule as performed by the operation schedule generation support function 11 will be described in detail. FIG. 7 shows screens 1000 to 5000 indicating the procedure for operation scheduling which corresponds to block 100 of FIG. 6.

A first screen 1000 illustrates load characteristic definition. The screen 1000 displays information read from the load characteristic data file 8c (see FIG. 6) that may be modified by user as necessary.

A second screen 2000 illustrates work mapping table definition. The screen 2000 permits the user to define the pattern of combinations of the transactions and the processing nodes, while referring to the first screen 1000. In this case, two or more patterns with different combinations can also be defined. It is also possible to make definitions such that a single processing node 1b to 1e performs parallel processing of multiple transactions simultaneously or that one transaction is shared by several processing nodes 1b to 1e.

A third screen 3000 illustrates operation management table definition. This screen 3000 permits the user to define the work mapping table to be executed in each time band, by referring to screens 1000 and 2000. Since the screens 2000 and 3000 are interrelated, they may be used on a trial-and-error basis and their definition sequence is not fixed.

A fourth screen 4000 displays load simulation. It displays the changes of the workload of each processing node 1b to 1e with time, based on the load characteristic, the operation management table and a work mapping table. This page 4000 permits the user to grasp at a glance the load of each processing node 1b to 1e on the basis of the defined work schedule. When there Is a significant variation of load between the processing nodes 1b to 1e, the procedure discussed above is repeated to redefine the work schedule to reduce or eliminate this load imbalance. After said correction is made, the content of the management files 8 are updated with new tables.

A fifth screen 5000 displays a menu, from which the user can repeat the above operations or refer to other screens (not illustrated). It is possible to display multiple screens (e.g. screens 1000 to 3000) at the same time, e.g. by windowing techniques.

The work mapping tables and the operation management tables generated in the procedure described above a redistributed from the management node 1a to all processing nodes 1b to 1e. The distribution of these tables occurs on-line, except during the start-up of the system. Each processing node 1b to 1e switches to the tables supplied by the work allocation data update function 16, uses them as current tables, selects the transaction to be processed according to the transaction selection function 17 of the block 200 (FIG. 6), and processes it. At this time, instead of selecting the work mapping table each time the step s402 is carried out, the corresponding work mapping table (transaction for the node) may be preselected when the work mapping table name is changed according to the operation management table in order to reduce the processing time for the step s402.

Transferring the transactions among processing nodes would normally require transfer of resources to ensure that a transferred transaction can be executed by the processing node to which it is transferred. However, in this embodiment, the transfer of work (jobs) between the processing nodes is determined by a plurality of predetermined tables, it is possible to ensure the work is only transferred within the range of resources available in each processing node, i.e. according to the processing capacity of each node. Thus, resources need not be transferred, since the transaction will only be transferred to a processing node which has the appropriate resources. This makes the configuration of the system flexible, improving the cost performance. It is of course possible to make the takeover of resources unnecessary by providing a data sharing node, such as a data base server, in the system so that desired data can be retrieved from that data sharing node.

With the above-mentioned functions, this system transfers transactions among computer in the distributed processing system as necessary to establish a balanced distribution of load among computers while making effective use of resources of the computers and thereby operate the system efficiently.

Figure 8:
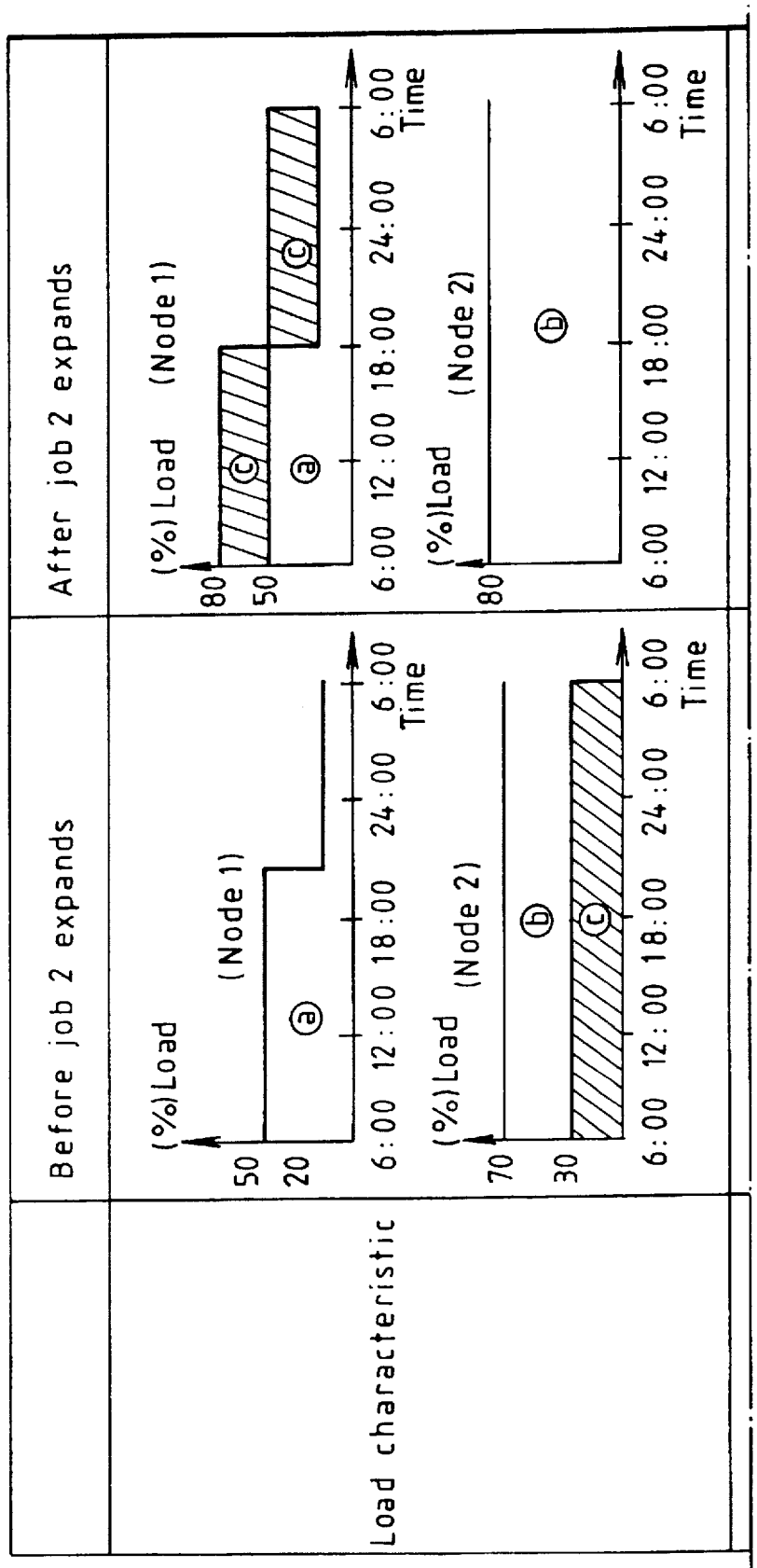
FIG. 8 illustrates the operations carried out when the number of transactions increases.

The system can be made flexible for coping with the situation where the processing capacity required by the system changes. FIG. 8 shows an example of the processing system for the transactions a to c when the load of the transaction c is double the normal load. In this embodiment, by changing the allocation of the transaction c to a node 1, i.e. by simply updating the current work mapping table A with the new work mapping table A' that has been maintained by the operation schedule generation support function, system expansion can easily be accommodated. In this example, because only one work mapping table A is used, the operation management table is not changed.

This embodiment also allows for degradation of function for each transaction. In the event that the system running state monitoring function 13 in the management node 1a detects any anomaly (fault) in the transaction n being executed, the degradation function 10 that supplements the work allocation function 9 erases the processing node in question for that transaction (by changing the flag from ○ to —) in the corresponding work mapping table. Then, a modified table is transferred to each processing node 1b to 1e, which is then updated accordingly. In this way function degradation is carried out when an anomaly is detected in any transaction. It is also possible for the degradation function 13 of the management node 1a to inform the processing nodes 1b to 1e of the transaction n to be degraded so that the transaction n is not executed when it is selected by the transaction selection function 17 in each processing node 1b to 1e.

Figure 9:
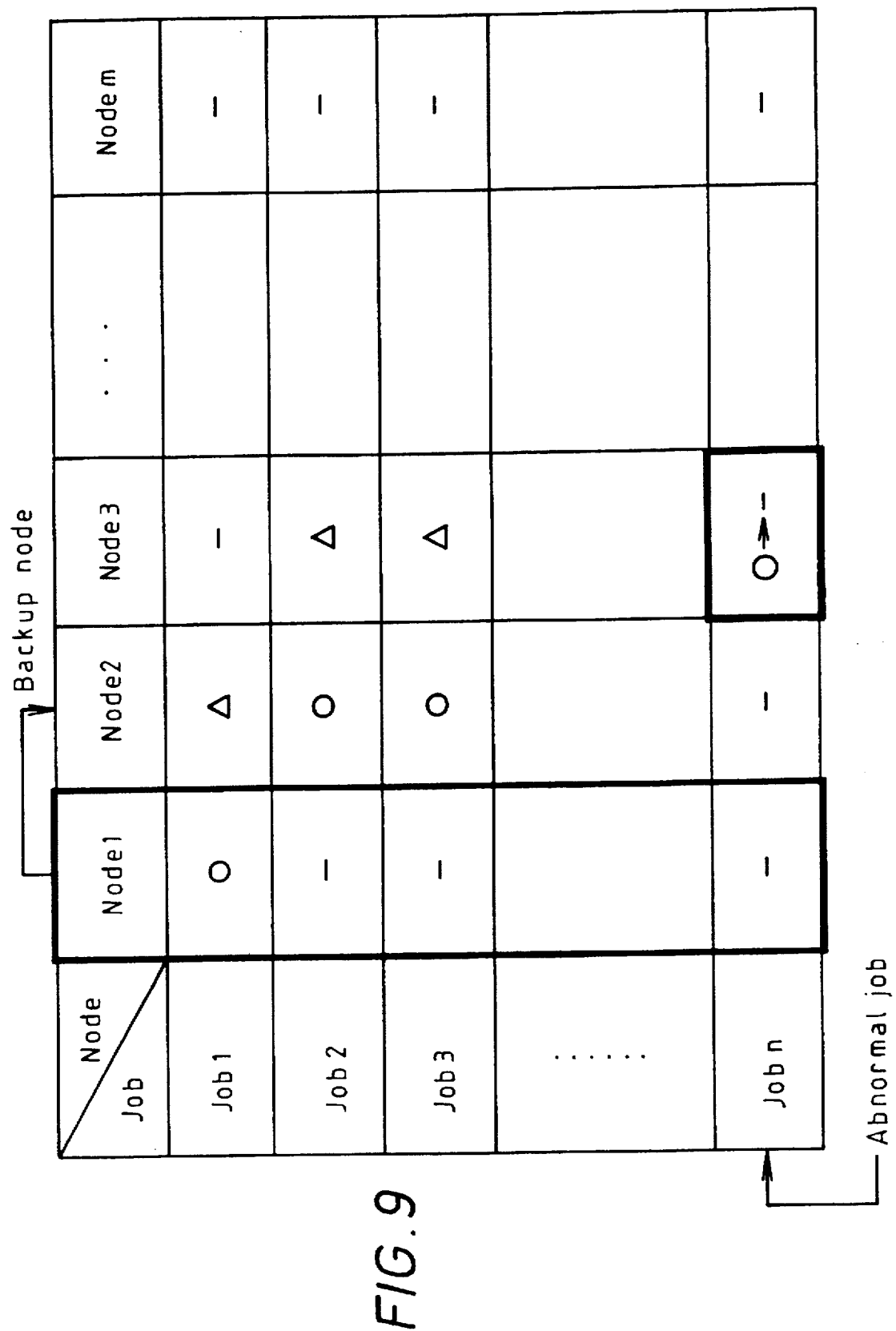
FIG. 9 shows a distribution arrangement (table) which may be used in a second embodiment of the present invention.

Next, another embodiment of this invention will be described with reference to FIG. 9. FIG. 9 relates to an embodiment in which back-up nodes are defined to permit processing to continue even if on processing node becomes faulty (goes down).

FIG. 9 shows a work mapping table, in which symbol "○", indicates that the corresponding node is to execute the assigned transaction. FIG. 9 considers the processing node 1 as an example of a node which goes down. This node is assigned to perform the transaction 1. Mark "Δ" indicates that the corresponding node performs the transaction as a backup. For instance, the transaction 1 is executed by the processing node 1. When the processing node 1 goes down, the processing node 2 takes over to perform the transaction 1. Mark "—" indicates that the node does nothing about the assigned transaction.

Thus, when a node receives a transaction, the processing of determining whether the transaction is to be processed involves three possible results. This is illustrated in FIG. 6. Firstly, if the transaction is one which the node is assigned to process, it processes that transactions (steps s403 and s405). Secondly, if the transaction is one assigned to another processor, the node must check if that other processor is down. if the node is intended to act as a back-up for that other processor (step s404). If that other processor is operating normally, the transaction is not processed.

If the node is specified as a backup node (marked Δ), it processes the associated transaction only when the processing node which it is backing up is down (steps s403, s404). The failure of a processing node is detected by the system running state monitoring function 13 in the management node and notified to the associated processing node. This allows the backup node to take over the transaction that was being processed by a failed processing node, thereby improving the fault tolerance of the distributed processing system. As in the first embodiment, two or more such work mapping tables are prepared and one of them is selected according to the operation management table.

Next, the load characteristic edit function 12 in a third embodiment of this invention will be explained with reference to the processing flow of block 300 in FIG. 6. The load characteristic edit function 12 periodically gathers the processing records of the processing nodes 1b to 1e via the communication line 6 (step s501). Each processing node 1b to 1e has a load measurement function 18 which accumulates processing records for the transactions processed by that node (number of transactions processed in a specified time interval) (step s406).

Figure 10:
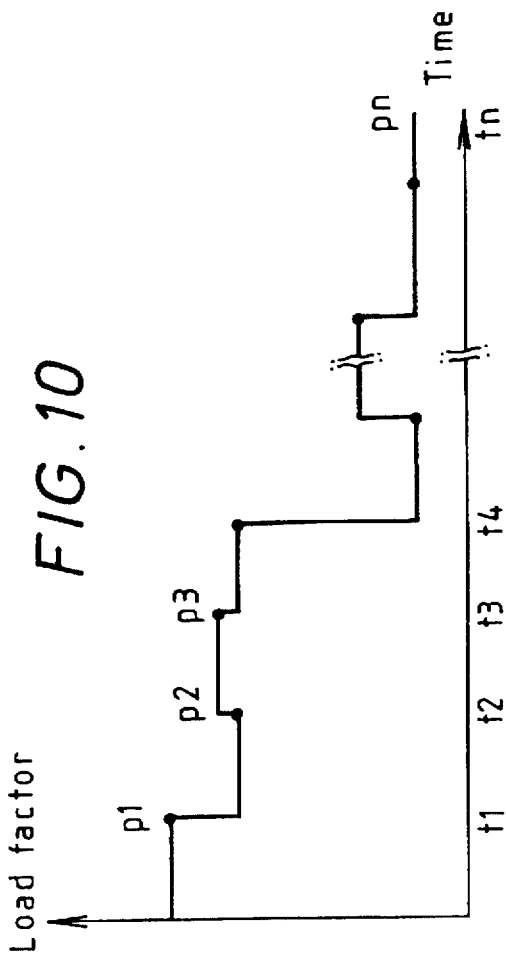
FIG. 10 is a graph showing the change of workload with time in embodiments of the present invention.

Using the number of transactions processed in each specified time interval, the system calculates an average load factor $\rho_i$ (%) at time $t_i$ (step s502) using Equation 1 below and edits it as a chronological load characteristic data. The data is then stored in a file 8c (step s503). This is shown in FIG. 10.

$$\rho_i = \frac{\text{number of transactions processed } n \text{ (times)}}{\text{measured time interval } \Delta t(S)} \times \quad \text{(Equation 1)}$$

unit load factor $\rho_i b$ for each transaction

In the above equation, $\rho_i b$ represents a unit load factor when each transaction is processed once (this value is predetermined measured in a test stage).

In this way, the management node 1a in this embodiment is provided with the load characteristic edit function 12 to collect automatically the load characteristic based on the recorded data for each processing node 1b to 1e and to calculate and edit the load factor. Hence, generation of the load characteristic, for use in generating the operation schedule, is automatically achieved by reading the records from the file 8c.

In this embodiment, modifications of the work mapping tables are made by the chronologically defined operation management table, other modification methods may be employed. Selection of a work mapping table, which represents a pattern of combinations defining the relationships between the transactions and the computers, may also be made. Thus, the relationship between the nodes and the combination patterns (names) may be predetermined on the basis of different kinds of events, such as a the excluding of a load factor (overload) if and when a node goes down (failure). Thus, an appropriate pattern can be chosen in the event of trouble. This selection is done by the management node 1a and the selection data (pattern name) is transmitted to each processing node 1b to 1e.

When a pattern is selected in the event that a node excludes a load factor, the processing is carried out as follows. The load measurement function 18 calculates the load factor for the processing node at specified time intervals. When that factor exceeds a predetermined upper limit, a signal is sent to the management node 1a. The management node 1a detects that signal, using the system monitoring function 13, and activates the job allocation function 9. This function 9 is notified which processing node has an excess load factor, (i.e. is overloaded) by the function 13, and then selects another work mapping table which will transfer a part of the transaction of the overloaded node to another node or other nodes. The function 9 sends the selected work mapping table, together with the modification notice, to the processing nodes 1b to 1e. If the selected table is already distributed, the management node 1 sends out the name of the modified table. The work allocation data update function 16 and transaction selection function 17 of each processing node combine to execute this transaction modification processing on-line.

In the event that a processing node 1b to 1e goes down, this is detected by the monitoring function 13 of the management node 1a and is dealt with in the same way for the case of an overload. Alternatively, pattern selection may involve preparing a number of patterns (work mapping tables) for various conditions and selecting a pattern according the detected or set conditions. This method allows for wider application of this invention.

The above embodiment controls the allocation of jobs using tables, but other management methods may be used. For example, the sharing of transactions among computers may be determined by using a set of inference rules and a program.

With this invention, since each processing node 1b to 1e has transactions pre-assigned thereto, it is possible to achieve a load distribution processing with high traffic and high response. The transactions can therefore be freely moved among the plurality of computers, allowing the system resources to be utilized effectively and permitting a distributed processing system with high cost performance. Also, since modifications and extensions of the transactions can be made easily by changing the work allocation software (tables), the system configuration has improved flexibility. Changing the mapping tables readily permits backing up of a processing node in the event of a node failure or overload, and also allows degrading of function in the event of an anomaly in the transaction. This improves the fault tolerance of the system. Moreover, since the records of the load pattern for each transaction may be collected and used for supporting the generation of the work allocation schedule designed to distribute the load evenly among computers, the work allocation schedule can be set up easily, permitting load distribution with high system efficiency.

What is claimed is:

1. A method of executing a plurality of transactions received by a computer network comprising a plurality of computers, said method comprising the steps of:

defining a plurality of distribution arrangements for said plurality of computers, each of said distribution arrangements designating at least one of said plurality of computers for each of said plurality of transactions to be executed in;

distributing one of said plurality of distribution arrangements to said plurality of computers;

executing said plurality of transactions in said plurality of computers in accordance to said one of said plurality of distribution arrangements;

distributing another of said plurality of distribution arrangements to said plurality of computers; and executing said plurality of transactions in said plurality of computers in accordance to said another of said plurality of distribution arrangements.

2. A method according to claim 1, wherein each of said plurality of distribution arrangements is a distribution table stored in at least one of said plurality of computers.

3. A method according to claim 1, wherein said another of said plurality of distribution arrangements is defined for an increased number of said plurality of computers, whereby said executing of said plurality of transactions in accordance with said another of said plurality of distribution arrangements corresponds to execution of said plurality of transactions among said increased number of said plurality of computers.

4. A method according to claim 1, including detecting a predetermined condition in any one of said plurality computers, wherein said another of said plurality of distribution arrangements corresponds to a distribution of said transactions in which none of said transactions are executed by said any one of said computers.

5. A method according to claim 4, wherein said predetermined condition corresponds to failure of said any one of said plurality of computers.

6. A method according to claim 1, including monitoring the execution of transactions by said plurality of computers and creating at least one further distribution arrangement representing a modified distribution of said transactions among said plurality of computers.

7. A method according to claim 1, wherein said another of said plurality of distribution arrangements is distributed on the basis of a predicted change in said transactions.

8. A method according to claim 1, including monitoring the execution of transactions by said plurality of computers and distributing said another of said plurality of distribution arrangements when any one of said plurality of computers is overloaded.

9. A method according to claim 1, wherein each of said plurality of distribution arrangements relates to a corresponding time period for execution of said plurality of transactions.

10. A method according to claim 1, wherein said step of distributing said another of said plurality of distribution arrangements to said plurality of computers is performed during said step of executing said plurality of transactions in said plurality of computers in accordance to said one of said plurality of distribution arrangements, said method further includes the step of generating a change signal to each of said plurality of computers, and said step of executing said plurality of transactions in said plurality of computers on the basis of the predetermined distribution in accordance to said another of said plurality of distribution arrangements is performed after said step of generating said change signal.

11. A method according to claim 1, wherein said step of defining said plurality of distribution arrangements includes inputting of data therefor by an operator.

12. A distributed processing system for processing a plurality of transactions received by said processing system, said processing system comprising a plurality of computers and means interconnecting said plurality of computers, said plurality of computers including a management computer and a plurality of processing computers; wherein:

said management computer includes first memory means for storing a plurality of distribution arrangements for said plurality of processing computers, each of said distribution arrangements designating at least one of said plurality of processing computers for each of said plurality of transactions to be executed in, and means for sequentially distributing at least some of said plurality of distribution arrangements to said processing computers; and each of said processing computers includes second memory means for storing sequentially said at least some of said plurality of distribution arrangements, and means for executing at least one transaction of said plurality of transactions in accordance to the contents of said second memory means.

13. A distributed processing system according to claim 12, wherein said management computer includes means for generating said plurality of distribution arrangements for said plurality of processing computers.

14. A distributed processing system according to claim 13, having user-controlled means for inputting data to said means for generating said plurality of distribution arrangements for said plurality of processing computers.

15. A distributed processing system according to claim 13, wherein said management computer includes means for modifying at least one of said plurality of distribution arrangements for said plurality of processing computers.

16. A distributed processing system according to claim 12, wherein said second memory means comprises first and second memory units for storing two adjacent ones of said at least some of said plurality of distribution arrangements.

17. A distributed processing system for processing a plurality of transactions received by said processing system, said processing system comprising a plurality of computers and means interconnecting said plurality of computers, said plurality of computers including a management computer and a plurality of processing computers; wherein:

said management computer includes first memory means for storing a plurality of distribution arrangements for said plurality of processing computers, each of said distribution arrangements designating at least one of said plurality of processing computers for each of said plurality of transactions to be executed in, and means for selecting one of said plurality of distribution arrangements on the basis of at least one said at least one characteristic corresponds to the occurrence of a predetermined condition in any one of said plurality of computers and said selected one of said plurality of distribution arrangements corresponds to a distribution of said transactions in which none of said transactions are executed by said any one of said computers; and each of said processing computers includes second memory means for storing said selected one of said plurality of distribution arrangements, and means for executing at least one transaction of said plurality of transactions in accordance to the contents of said second memory means.

18. A distributed processing system according to claim 17, wherein said at least one characteristic corresponds to the number of computers comprised in said plurality of processing computers.

19. A distributed processing system according to claim 17, wherein said at least one characteristic corresponds to the occurrence of a predetermined condition in any one of said plurality of computers, and said selected one of said plurality of distribution arrangements corresponds to a distribution of said transactions in which none of said transactions are executed by said any one of said computers.

20. A distributed processing system according to claim 17, wherein said at least one characteristic corresponds to overload of said any one of said plurality of processing computers.

21. A distributed processing system according to claim 17, wherein said at least one characteristic is a time characteristic.

* * * * *

UNITED STATES PATENT AND TRADEMARK OFFICE
CERTIFICATE OF CORRECTION

PATENT NO. : 5,778,224

DATED : 7 July 1998

INVENTOR(S) : Akihiko TOBE et al.

It is certified that error appears in the above-identified patent and that said Letters Patent is hereby corrected as shown below:

THE TITLE PAGE: [75], line 1: Change "Naka-machi" to --Naka-gun--.

| Column | Line | |
|--------|------|---|
| 4 | 51 | Change "computer 1" to --computer 1a--. |
| 8 | 17 | Change "a redis-" to -- are dis- --. |
| 9 | 49 | Change "1a" to --1a--. |

Signed and Sealed this

Ninth Day of March, 1999

Attest:

Q. TODD DICKINSON

*Attesting Officer*     Acting Commissioner of Patents and Trademarks